US010491601B2

(12) United States Patent
Da et al.

(10) Patent No.: US 10,491,601 B2
(45) Date of Patent: Nov. 26, 2019

(54) AREA RESTRICTED ACCESS SYSTEM, METHOD AND NON-TRANSITORY COMPUTER-READABLE STORAGE MEDIUM

(71) Applicants: Bin Da, Beijing (CN); Wei Wang, Beijing (CN); Haihua Yu, Beijing (CN); Ke Liao, Beijing (CN); Linju Yang, Beijing (CN)

(72) Inventors: Bin Da, Beijing (CN); Wei Wang, Beijing (CN); Haihua Yu, Beijing (CN); Ke Liao, Beijing (CN); Linju Yang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 15/200,957

(22) Filed: Jul. 1, 2016

(65) Prior Publication Data
US 2017/0006043 A1 Jan. 5, 2017

(30) Foreign Application Priority Data
Jul. 2, 2015 (CN) .......................... 2015 1 0382714

(51) Int. Cl.
*G06F 7/04* (2006.01)
*H04L 29/06* (2006.01)
(Continued)

(52) U.S. Cl.
CPC .......... *H04L 63/107* (2013.01); *G06F 21/305* (2013.01); *G06F 21/6209* (2013.01);
(Continued)

(58) Field of Classification Search
CPC ....................... G06F 2221/2111; H04L 9/0872
(Continued)

(56) References Cited

U.S. PATENT DOCUMENTS 8,549,584 B2 10/2013 Singh et al.
8,644,818 B1 * 2/2014 Okmyanskiy ....... H04W 64/003
370/331

(Continued)

FOREIGN PATENT DOCUMENTS

CN 102741705 A 10/2012
CN 103200155 A 7/2013

OTHER PUBLICATIONS

Chin et al, A Signal Strength Based Location Estimation Algorithm within a Wireless Network, 2011, IEEE, pp. 509-516.*
(Continued)

*Primary Examiner* — Luu T Pham
*Assistant Examiner* — Jenise E Jackson
(74) *Attorney, Agent, or Firm* — Oblon, McClelland, Maier & Neustadt, L.L.P.

(57) ABSTRACT

An area restricted access system, method, and non-transitory computer-readable storage medium are provided. The system includes an access device and a first service device located in a service area, wherein the access device locates a user device via a first type of wireless signals and obtains a first location parameter. The first service device monitors and locates the user device via a second type of wireless signals and obtains a second location parameter. The area restricted access system generates a modified location parameter based on the first and the second location parameters and determines whether the user device is within or out of the service area based on the modified location parameter. The first service device allows the user device to access the first service device when the user device is within the service area, and forbids the user device to access the first service device when the user device is out of the service area.

14 Claims, 5 Drawing Sheets

(51) Int. Cl.
  *H04W 4/04* (2009.01)
  *H04W 12/08* (2009.01)
  *H04W 4/021* (2018.01)
  *G06F 21/30* (2013.01)
  *G06F 21/62* (2013.01)
  *G06F 16/29* (2019.01)
  *H04W 84/12* (2009.01)

(52) U.S. Cl.
  CPC ............ *H04W 4/021* (2013.01); *H04W 4/04* (2013.01); *H04W 12/08* (2013.01); *G06F 16/29* (2019.01); *G06F 2221/2111* (2013.01); *H04W 84/12* (2013.01)

(58) Field of Classification Search
  USPC .......................................................... 726/4
  See application file for complete search history.

(56) References Cited

U.S. PATENT DOCUMENTS

| | | | | |
|---|---|---|---|---|
| 8,670,425 | B1* | 3/2014 | Xue | H04W 4/029 370/338 |
| 9,377,522 | B2* | 6/2016 | Edge | G01S 1/66 |
| 9,549,288 | B2* | 1/2017 | Werner | H04W 4/023 |
| 9,743,254 | B2* | 8/2017 | Friday | H04W 4/043 |
| 9,781,570 | B2* | 10/2017 | Cho | H04W 4/027 |
| 10,192,400 | B2* | 1/2019 | Price | G07F 17/3241 |
| 2003/0036389 | A1* | 2/2003 | Yen | H04W 8/183 455/456.1 |
| 2003/0217137 | A1* | 11/2003 | Roese | G01S 5/02 709/223 |
| 2008/0155094 | A1* | 6/2008 | Roese | G01S 5/02 709/224 |
| 2012/0229249 | A1* | 9/2012 | Gritti | G01S 15/04 340/4.34 |
| 2013/0028245 | A1* | 1/2013 | Oerton | H04W 4/00 370/338 |
| 2013/0143588 | A1* | 6/2013 | Flanagan | G01S 5/0252 455/456.1 |
| 2013/0212204 | A1* | 8/2013 | Kearney, III | H04W 4/021 709/208 |
| 2014/0118113 | A1* | 5/2014 | Kaushik | H04W 12/12 340/8.1 |
| 2014/0195291 | A1 | 7/2014 | Aaron et al. | |
| 2015/0080019 | A1* | 3/2015 | Edge | G01S 5/0236 455/456.1 |
| 2015/0237194 | A1* | 8/2015 | Aaron | H04M 1/72572 455/414.1 |
| 2016/0037300 | A1* | 2/2016 | Vitek | H04W 4/023 455/456.3 |
| 2016/0139239 | A1* | 5/2016 | Thiagarajan | G01S 5/10 455/456.1 |
| 2016/0323717 | A1* | 11/2016 | Friday | H04W 4/043 |
| 2016/0360429 | A1* | 12/2016 | Li | H04B 7/00 |
| 2017/0013586 | A1* | 1/2017 | Oerton | H04W 4/00 |
| 2017/0195843 | A1* | 7/2017 | Smith | H04W 4/023 |
| 2017/0289770 | A1* | 10/2017 | Kan | H04W 4/022 |
| 2018/0040194 | A1* | 2/2018 | Price | G07F 17/3241 |

OTHER PUBLICATIONS

Kraxberger et al, WLAN Location Determination without Active Client Collaboration, 2010, ACM, pp. 1188-1192.*
Combined Chinese Office Action and Search Report dated Feb. 27, 2019 in Chinese Patent Application No. 201510382714.8 (submitting English translation only), 12 pages.

* cited by examiner

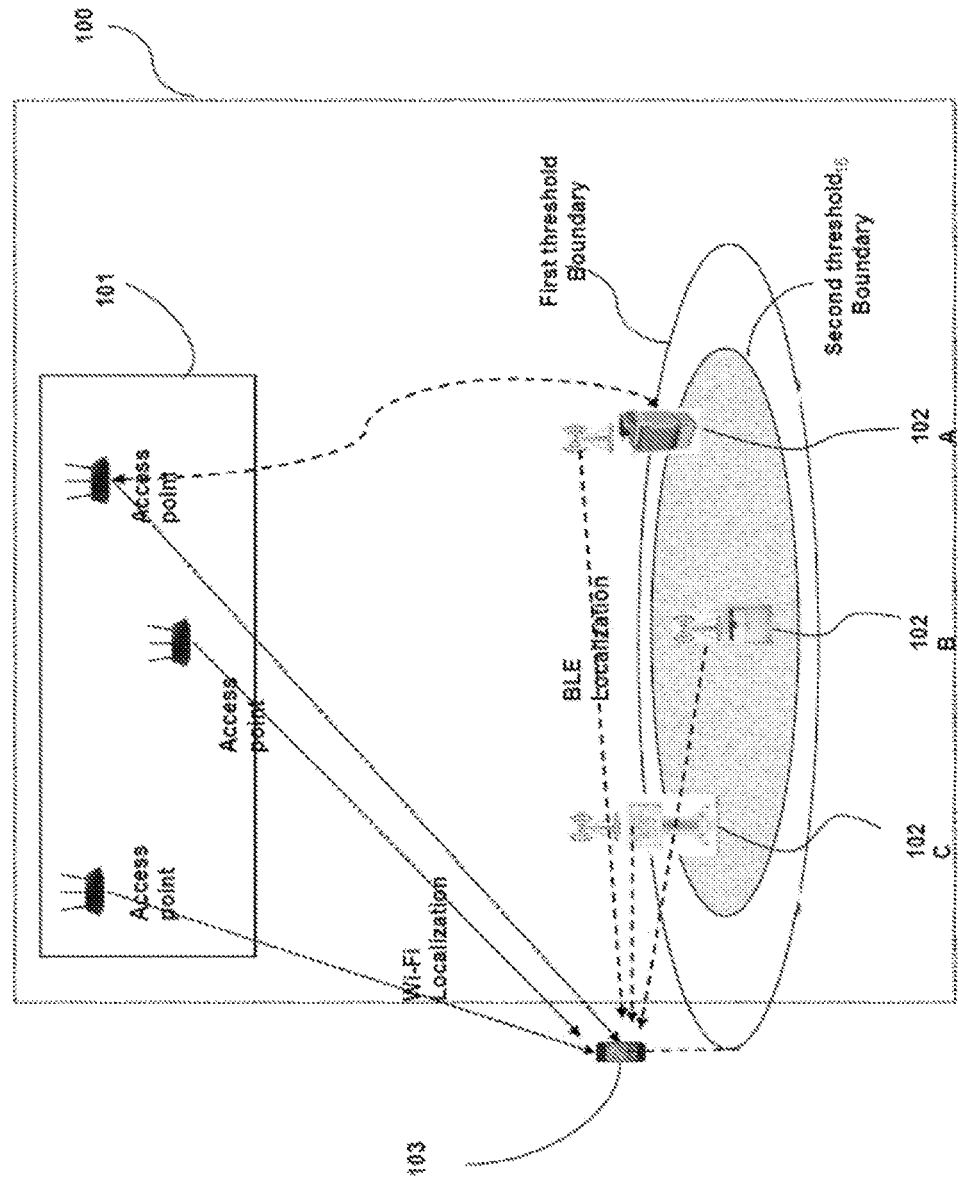

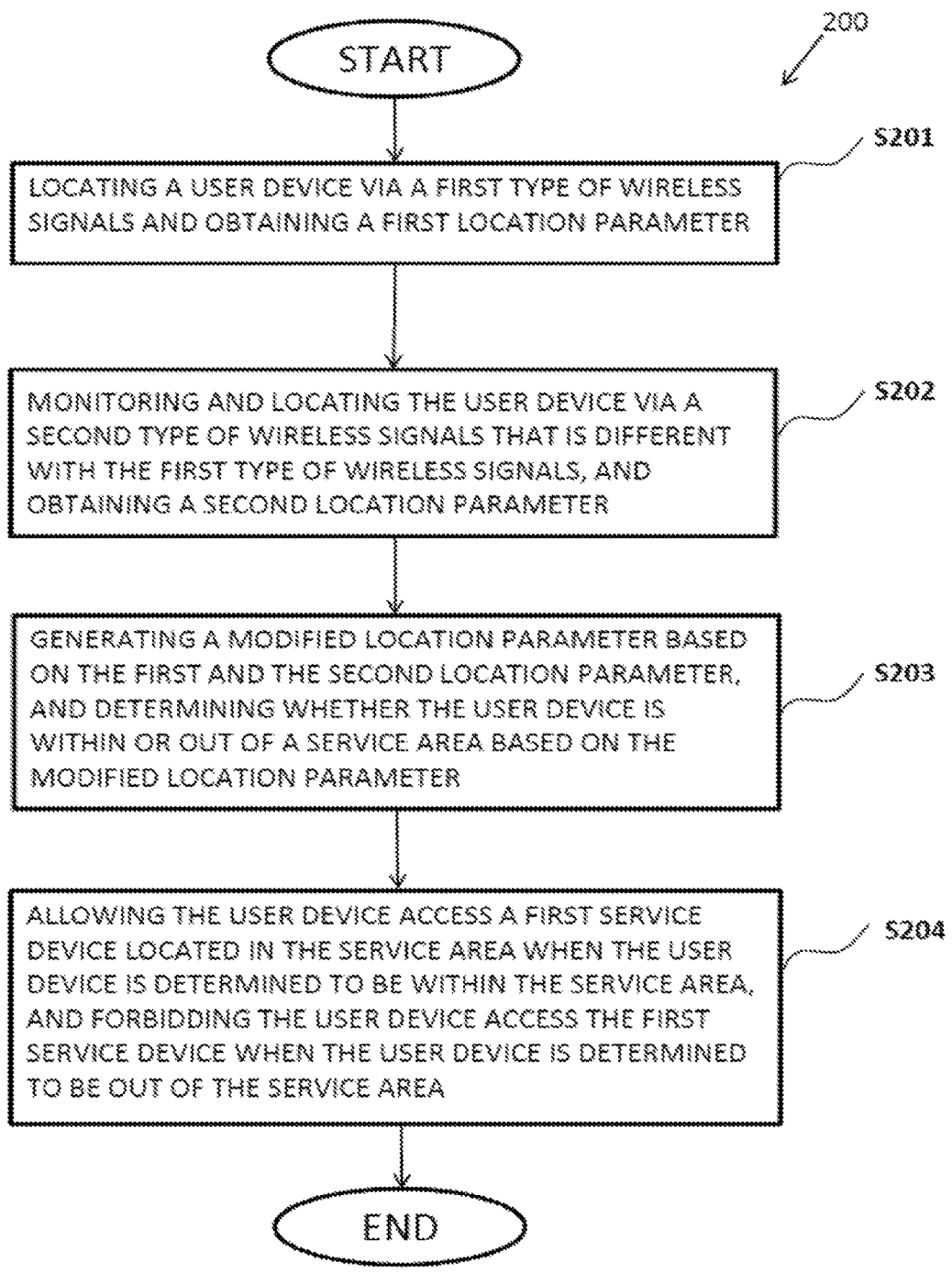

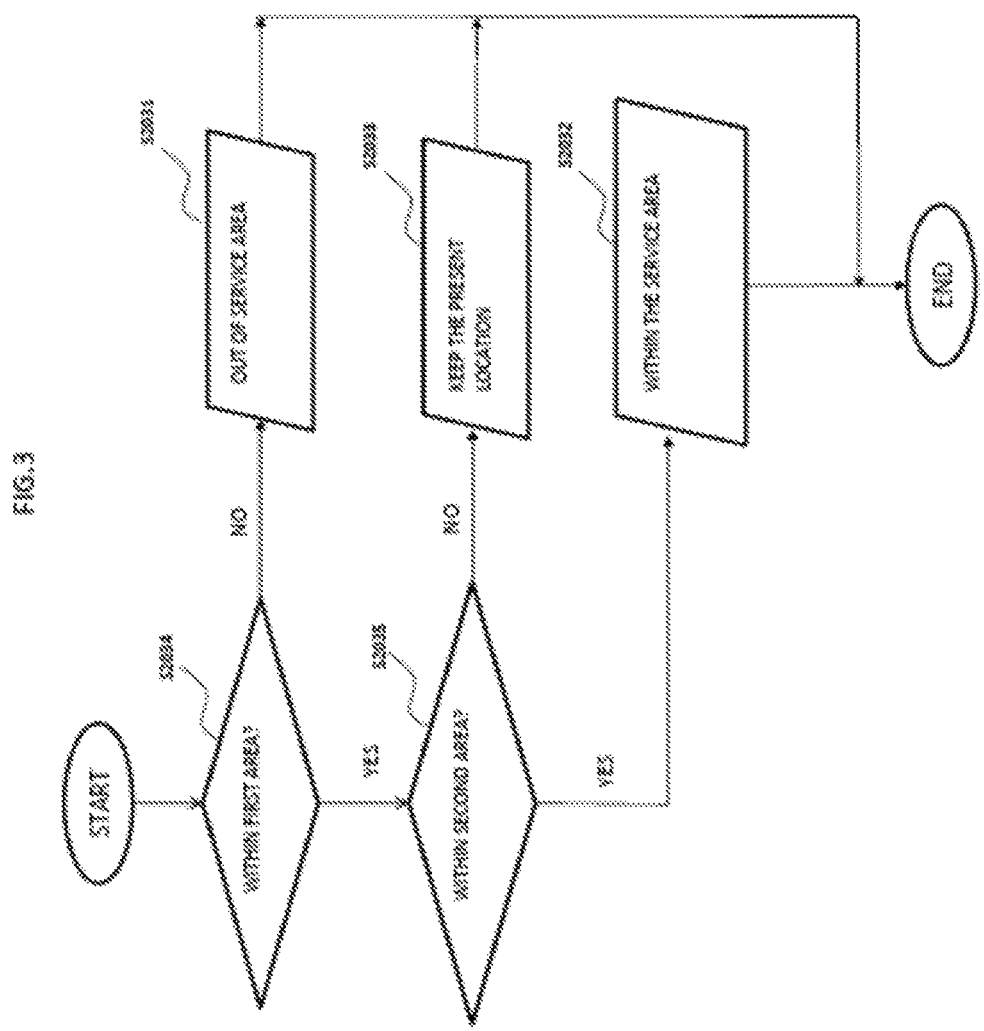

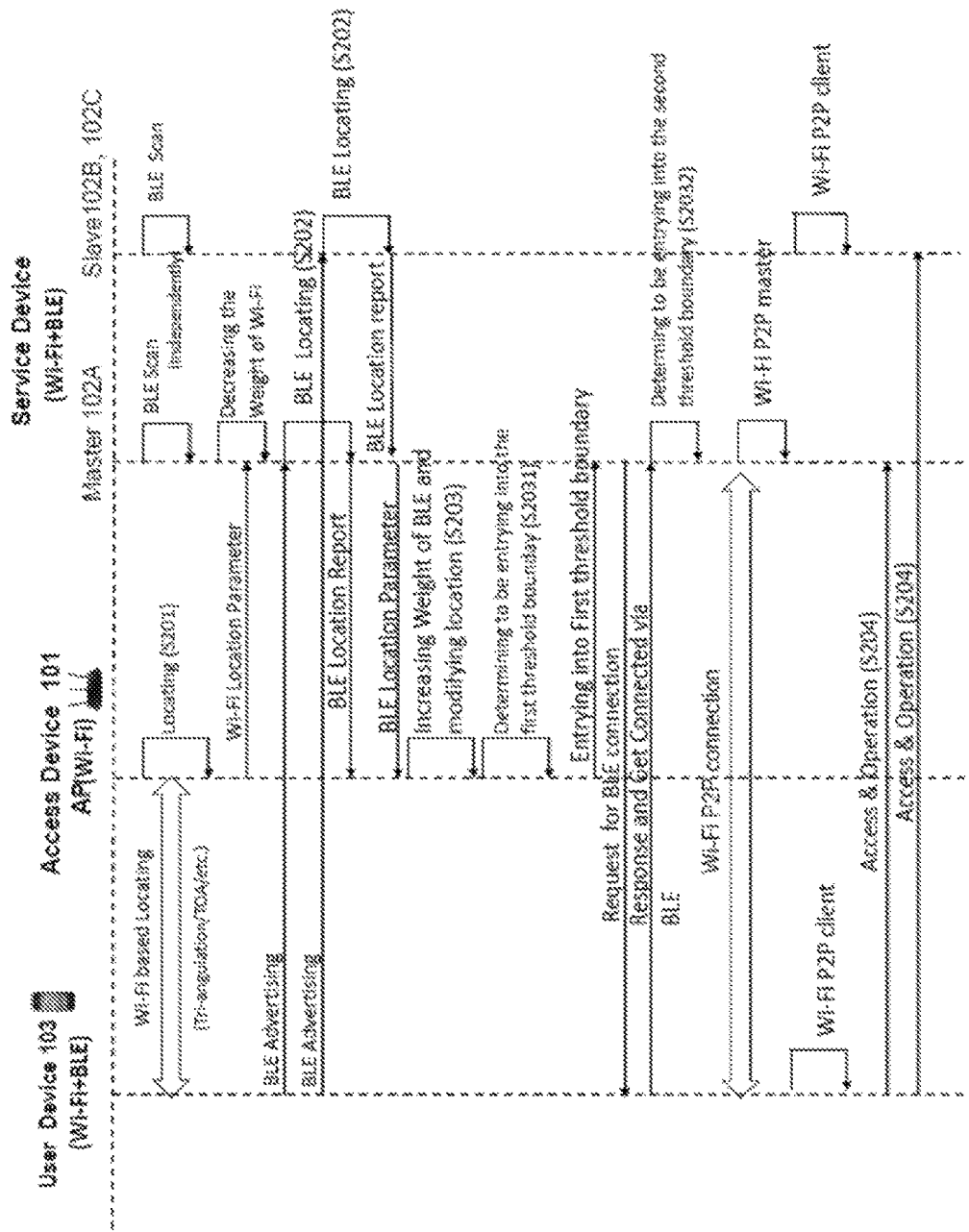

AREA RESTRICTED ACCESS SYSTEM, METHOD AND NON-TRANSITORY COMPUTER-READABLE STORAGE MEDIUM

CROSS-REFERENCE TO RELATED APPLICATIONS

The present application is based on and claims the benefit of priority of Chinese Application No. 201510382714.8 filed on Jul. 2, 2015, the entire contents of which are incorporated herein by reference.

BACKGROUND

Field

The present disclosure relates to an area restricted access system, method and non-transitory computer-readable storage medium.

Description of Related Art

In many cases, in order to achieve safety protection for a service device in a special area, access control needs to be implemented for the service device, such that only a mobile device in the special area can access the service device. For example, a modern office environment might include a plurality of service devices (such as printers, projectors, scanners, etc.) in a room. Usually, it is desired that only the mobile device that is in the room, rather than any other mobile device, is allowed to use the service devices.

A unified access control component (UACC) is provided in U.S. Pat. No. 8,549,584 ("Physical security triggered dynamic network authentication and authorization"), for implementing access control from a user to some network resources, e.g., sensitive data, based on physical location information.

In Chinese patent application CN103200155A ("An area-restricted access control system and method"), a system that includes a resource server, a confinement signal device, and a mobile terminal is provided in which the confinement signal device offers the certification information required for accessing the resource server to the mobile terminal, and only the mobile terminal passing through certification can access the resource server. By this method, only the mobile in the service area can obtain certification information. The confinement signal device emits an ultrasound signal, low-frequency electromagnetic waves, or an infrared signal. However, the localization of the user equipment and the user experience according to the related art still needs further improvement.

SUMMARY

The present disclosure provides an area-restricted access system, method, and non-transitory computer-readable storage medium, which can realize area restricted access for a user device, and can accurately locate the user device and implement position status determination.

According to one embodiment, there is provided an area restricted access system, comprising: (1) an access device configured to locate a user device via a first type of wireless signals and obtain a first location parameter; and (2) a first service device located in a service area and configured to monitor and locate the user device via a second type of wireless signals that is different from the first type of wireless signals, and obtain a second location parameter, wherein (a) at least one of the access device and the first service device is configured to generate a modified location parameter based on the first and the second location parameters, and determine whether the user device is within or out of the service area based on the modified location parameter, and (b) the first service device is configured to allow the user device to access the first service device when the user device is determined to be within the service area, and forbid the user device to access the first service device when the user device is determined to be out of the service area. In one embodiment, the modified location parameter is a weighted average value of the first and second location parameters, and a weight of the second location parameter is increased as the user device becomes closer to the service area.

In another embodiment, the step of determining whether the user device is within or out of the service area based on the adjusted location parameter includes: determining that the user device is out of the service area when a position of the user device based on the modified location parameter is determined out of a first area defined by a first threshold boundary, determining that the user device is within the service area when the position of the user device based on the modified location parameter is determined within a second area defined by a second threshold boundary, while the second area is within a scope of the first area, and determining that the user device keeps the present location situation when the position of the user device based on the modified location parameter is determined to be out of the second area but within the first area.

In another embodiment, the first service device is configured to connect to the user device via the second type of wireless signals when the user device is determined to be within the first area based on the modified location parameter.

In another embodiment, the first service device is configured to directly connect to the user device via the first or second type of wireless signals when the user device is determined to be within the service area, such that the user device has access to the service device located in the service area.

In another embodiment, the first type of wireless signals is Wi-Fi signals, and the second type of wireless signals is Bluetooth signals, infrared signals, or ultra-sonic signals.

In another embodiment, the first service device is configured to monitor and locate the user device according to a scheduled appointment of the user device for accessing the service area.

In another embodiment, the area restricted access system further comprises a second service device located in the service area, wherein the first service device is configured as a master device and the second service device is configured as a slave device. The master device is further configured to allow the user device to access the slave device when the user device is determined to be within the service area, and forbid the user device to access the slave device when the user device is determined to be out of the service area.

In another embodiment, there is provided an area restricted access method, comprising: (1) locating a user device via a first type of wireless signals and obtaining a first location parameter; (2) monitoring and locating the user device via a second type of wireless signals that is different from the first type of wireless signals, and obtaining a second location parameter; (3) generating a modified location parameter based on the first and second location parameters, and determining whether the user device is within or out of a service area based on the modified location parameter; and (4) allowing the user device access to a first service device located in the service area when the user device is determined to be within the service area, and forbidding the user device access to the first service device when the user device is determined to be out of the service area.

The above description of the embodiments of the system can also be applied to the embodiments of the method described herein. Therefore more detailed descriptions are omitted. According to the disclosure, it is possible to more accurately locate the user device and determine its position status, and it is possible to track and determine access authorization for a user device.

BRIEF DESCRIPTION OF THE DRAWINGS

The above aspects and merits and/or other aspects and merits of the disclosure will become more apparent from the following detailed description of the embodiments when read in conjunction with the accompanying drawings. The drawings are provided for further explaining the disclosure, and are a part of the specification.

FIG. 1 is a schematic drawing illustrating a user device and the overall hardware configuration of an area restricted access system according to an embodiment of the present disclosure;

FIG. 2 is a flowchart illustrating an area restricted access method according to an embodiment of the present disclosure;

FIG. 3 is a flowchart illustrating a method of determining whether the user device is within or out of the service area according to an embodiment of the present disclosure;

FIG. 4 illustrates a process sequence of the area restricted access method according to an embodiment of the present disclosure.

DETAILED DESCRIPTION

Figure 5A:
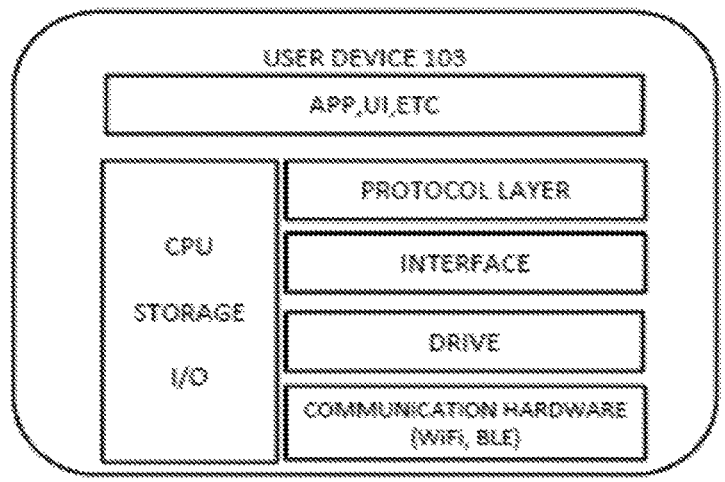
FIGS. 5A to 5C respectively illustrate block diagrams of a user device, a master (or slave) device, and an access device that can be applied to the embodiments of the present disclosure.

In the following, embodiments of the disclosure are described in detail with reference to the accompanying drawings so as to facilitate the understanding of the disclosure. The disclosed embodiments and other embodiments made by persons skilled in the art without creative work belong to the scope of the disclosure.

According to the disclosure, an area restricted access system and method are provided. Here, "area restricted access" means that a mobile device (e.g., a user device) in a special area (e.g., a service area, such as a special room in an office building) can be authorized access to use a service device (such as a printer, projector, scanner, etc.) in the special area. According to one embodiment, in order to achieve area restricted access, two types of wireless signals are used to locate the user device that will enter into or has entered into the target service area. Here, the user device can be any device having a wireless interface, for example, a smartphone, a tablet computer, a laptop computer, etc.

According to one example, an area restricted system 100 is provided. As shown in FIG. 1, system 100 includes access device 101 and three service devices 102A-102C in the service area. However, it should be noted that the system 100 is not limited to the embodiment shown in FIG. 1. The system 100 can have any number of service devices, for example, only one service device (wherein the one service device would be configured as a master device), or two or more service devices (wherein one device would be configured as the master device while the others would be configured as slave devices). In the following description, as an example, system 100 with three service devices 102A-102C is described with reference to FIG. 1.

Access device 101 can be any device that can locate user device 103 (e.g., a smartphone) that is within signal range of the access device 101 by using a first type of wireless signals (e.g., Wi-Fi signals). For example, access device 101 can be a device with plural Wi-Fi access points (AP). Optionally, access device 101 can be connected to the Internet. In FIG. 1, as an example, the access device 101 has three Wi-Fi access points that can be conventional Wi-Fi routers. It should be noted that the access device 101 can also be embodied in the service devices 102A-C.

Additionally, system 100 includes plural service devices 102A-C within the service area. Here, "service device" means a device offering a digital service, for example, a printer, a projector, a scanner, etc. Furthermore, "service area" means an area that has one or more service devices, for example, a room. Service devices 102A-C can connect to each other via a wireless connection (e.g., Wi-Fi) or a wired connection and form a sub-service system, and one of the service devices can act as a master device while the other devices act as slave devices. The master device administers a session between each service device and a session with external devices (such as access device 101 or user device 103). In order to describe the embodiments, service device 102A is designated as the master device hereinafter as an example.

According to the above example, master device 102A, access device 101, and user device 103 interact with each other via a wired or wireless connection. For example, access device 101 and master device 102A can connect to each other via a wired or wireless (e.g., Wi-Fi). For example, all devices can connect to the Internet, while access device 103 can connect to the access device 101 via anyone of the Wi-Fi access points, and then connect to the master device 102A, which is located in the service area. It should be noted that the user device 103 can also connect to the Internet via other means (for example, via a 3GPP or LTE wireless communication signal) and then connect to the master device 102A.

The localization based on Wi-Fi can utilize a traditional Wi-Fi localization algorithm, for example, a triangulation localization algorithm. In one example, each of three Wi-Fi access points sends signals that include the ID information of the Wi-Fi access point to the user device 103. When the user device 103 receives the signals, it sends the ID information of the Wi-Fi access point together with the strength of each received signal to a third party localization server for localization calculation, or the user device 103 can implement the localization calculation itself based on the received information.

As for the localization algorithm, for example, a triangulation localization algorithm can be utilized, which implements a localization calculation based on the distance between the user device and the Wi-Fi access point retrieved from the position information of the Wi-Fi access point and the strength of the received signals. If the localization calculation is not carried out in the access device 101, for example, it is carried out by a third party, e.g., a separate controller of the user device, and the localization calculation result (location parameter) can be sent to the access device 101.

It should be noted that the location parameter can be 1-D, 2-D, or 3-D position information. As an example, the location parameter can be a distance from the user device 103 to the center (or another predetermined position) of the service area. Further, it should be noted that the localization algorithm is not limited to a triangulation localization algorithm. For example, the TOA (Time Of Arrival) localization algorithm can also be utilized. Further, the first type of wireless signal is not limited to Wi-Fi signals, but can also be GPS signals, 3GPP signals, LTE wireless communication signals, or any other wireless signal that can be used in localization.

In some examples, various internal or external wireless interfaces (e.g., a Bluetooth interface, an infrared interface, an ultrasonic interface) of the service device 102A-C can be utilized to assist in localization of the user device. For example, Bluetooth signals can be utilized to assist in localization of the user device in order to improve the localization accuracy. In the example shown in FIG. 1, at least a part (sub system) of the service device monitors and locates the user device 103 via a second type of wireless signals (for example, using Bluetooth signals), which are different than the first type wireless signals, and the first type of wireless signals can realize localization for farther distances compared with the second type of wireless signals.

The localization based on Bluetooth signals can utilize a traditional BLE (Bluetooth Low Energy) localization algorithm, such as the RSSI (Received Signal Strength Indication) algorithm. In one example, the service device 102A-C turns on the Bluetooth listening mode, and the user device 103 turns on the Bluetooth advertising mode. When the service devices 102A-C received a Bluetooth signal from the user device 103, each of the service devices 102A-C can calculate the distance between the user device 103 to the corresponding service device based on the strength of the received Bluetooth signals. Here, it is assumed that the service devices 102A-C know the transmitted power of the user device, which can be realized though the transmission protocol between the user device 103 and the master device 102A.

After each service device aggregates the strength of the received signals or the determined distance to a device of the sub-service system (such as master device 102A or a separated controller of the sub-service system), the position of the user device 103 can be calculated. Here, the localization calculation for the user device 103 can also utilize the above-mentioned triangulation localization algorithm. However, if distance information from two service devices can be obtained, the 2-D position of the user device can be calculated, assuming that the user device is at the same height as the service device.

Additionally, the present disclosure also covers the situation that only one service device exists and that the service device implements assistant localization. In such a situation, the service device might have plural Bluetooth interfaces located at different positions and the distances from the different Bluetooth interfaces to the user device 103 can be utilized for localization. Alternatively, the service device has only one Bluetooth interface and the distance from that Bluetooth interface to the user device 103 can be used as the localization parameter, which means the localization parameter is a 1-D distance. It should be noted that ultrasonic signals or infrared signals can also be used as the second type of wireless signals, and a similar localization mechanism can be utilized.

After localization for user device 103 has been carried out using two types of wireless signals, respectively, the area restricted access system 100 can obtain a modified location parameter based on a first location parameter obtained via the first type of wireless signals (hereinafter, "first location parameter") and the second location parameter obtained via a second type of wireless signals (hereinafter, "second location parameter"). The area restricted access system 100 can implement the above process by the access device 101 (e.g., the controller of access device 101), the service device of the sub-service system (e.g., master device 102A), a separate control device, or by the access device 101 and the sub-service system at the same time, e.g., each implementing a part of the above process, respectively.

Because the localization based on any one wireless signal can have a certain inaccuracy error, according to the present disclosure the user device is located using two types of wireless signals for obtaining a first location parameter and a second location parameter, respectively. Then, a modified location parameter is obtained based on the two location parameters, which can improve the localization accuracy.

According to the disclosure, there are many different methods for determining the modified location parameter. For example, the first and the second location parameter can be averaged or be merged by any other merging method. Alternatively, one of the first and the second location parameters can be chosen as the modified location parameter, for example, the one of the first and the second location parameters that is closer to (or farther away from) the service center can be chosen as the modified location parameter. As another example, the modified location parameter can be a weighted average of the first and second location parameters, and a weight of the second location parameter can be increased as the user device becomes closer to the center of the service area.

Generally, the transmission distance of Wi-Fi signals is larger than Bluetooth signals. When a user device is far away from the service area, weak Bluetooth signals or even no Bluetooth signals could be received. Therefore the error of the second localization parameter is large, and when the user device is closer to the service area (for example, inside the service area), Bluetooth signals will be stronger, and the accuracy of the second localization parameter will be higher. Therefore, by increasing the weight of the second location parameter when the user device is closer to the center of service area, the accuracy of the localization can be improved.

It should be noted that the "center" of the service area need not be the geometric center, but can be any position within the service area predetermined by the user or system administrator. When only one service device exists, the position of the service device can be determined as the center of the service area. In calculating the weighted averaging of the first location parameter and the second location parameter, the value of the first location parameter and the second location parameter in each dimension can be averaged so as to obtain a multi-dimensional modified location parameter. The distance from the user device to the center of the service area included in the first location parameter and the second location parameter, respectively, can also be weight averaged.

When there is only one service device in the service area and only a one-dimensional distance (i.e., the second location parameter is a one-dimensional distance) from the user device to the service device can be obtained, when the first location parameter is a multi-dimensional position parameter, the first location parameter can be converted to a one-dimensional distance from the user device to the service device, and then weight averaged with the second location parameter to obtain the modified distance information. Furthermore, if necessary, modified multi-dimensional position information can be obtained based on the direction information within the first location parameter and the modified distance information.

Substantively, in order to merge the first location parameter with the second location parameter, the following process can be performed: send the distance information obtained by each service device to the access device separately, and use the distance information to merge with the first location parameter (e.g., weighted average). It should be noted that, "weight of the second location parameter is increased as the user device becomes closer to the service area" should not be understood to mean only that the weight is changed with distance gradually. It is also possible to divide the distance into several intervals, and different weights can be used according to different intervals. For example, when the distance is larger than 6 m, the weight of the second location parameter can be 0. When the distance is larger than 4 m, but smaller than or equal to 6 m, the weight of the second location parameter can be 50%. When the distance is smaller than or equal to 4 m, the weight of the second location parameter can be increased to 90% or even 100%. Thus, accuracy localization can be realized.

The measured distance for determining the weight can be a distance based on one location parameter, and it can also be a distance based on two location parameters and calculated with the present weight. For example, the present weight of the second location parameter might be 50%, and the calculated distance based on the present weight is 3.5 m, and based on the distance 3.5 m, the weight can be re-determined and the re-determined weight is 90%, and then the real distance would be re-calculated based on the re-determined weight (the re-calculated distance was 3.2 m). When the calculated distance based on the present weight (50%) is 5 m, the system would not re-determine the weight and re-calculate the distance because the present weight corresponds to the calculated distance, i.e., the real distance is 5 m.

After obtaining the modified location parameter, the system 100 can determine whether the user device is within or out of the service area based on the modified location parameter. The area restricted access system 100 can implement the determining process using the access device 101 (such as its controller), the service device of the sub-service system (such as master device 102A), an independent control device, or the access device 101 and the sub-service system at the same time in cooperation (e.g., each implementing a part of the above process, respectively). The determined result is finally sent to the master device 102A for deciding whether to allow the user device 103 to access the service devices 102A-102C in the service area or not. In the determining process, a boundary of the service area can be defined by a threshold boundary, and the user device can be determined to be within the service area when a position of the user device 103 based on the modified location parameter is determined to be within the area defined by the threshold boundary. Otherwise, the user device 103 can be determined to be out of the service area.

When the position of the user device 103 based on the modified location parameter is determined to be on the boundary (as shown in FIG. 1), it can be determined to be within or out of the service area according to a particular need. Here, the threshold boundary can be a distance (threshold distance) from the boundary to the center of the service area. In such cases, the area defined by the threshold distance can be a circle and the distance from the user device 103 to the center of the service area obtained from the modified location parameter can be compared with the threshold distance in order to determine whether the user device 103 is within or out of the area. If the distance obtained from the modified location parameter is smaller than the threshold distance, the user device 103 can be determined to be within the service area. Otherwise, the user device can be determined to be out of the service area.

Substantively, the service area defined by the threshold boundary can be a non-circular area, such as a rectangle or any other shape. In this case, 2-D information according to the location parameter can be used to determine whether the user device 103 is within or out of the service area. For example, in order to define the service area as a rectangle, a 2-D threshold boundary can be used. In this case, when each dimension value of the location parameter is determined to be within the corresponding range of the threshold boundary, the user device can be determined to be within the service area.

According to some embodiments, in order to determine whether the user device 103 is within or out of the service area, as shown in FIG. 1, two threshold boundaries, namely a first threshold boundary and a second threshold boundary, respectively, can be set, and the second area defined by the second threshold boundary can be within the first area defined by the first threshold boundary. When the user device 103 is close to the service area and passes through the first threshold boundary, but is outside the second threshold boundary, the system 100 might not be able to determine that the user device is within the service area, and can determine that the user device 103 is still out of the service area. At this time, the system 100 can not implement any operation. Alternatively, the system can also implement some operations, for example, connecting the user device 103 to the master device 102A via Bluetooth signals, while forbidding the user device 103 access to the service devices 102A-102C at the same time.

When the user device 103 moves closer to the center of the service center and passes through the second threshold boundary, then the user device 103 can be determined to be within the service area. Then, when the user device 103 departs from the service area and the user device 103 is determined to be out of the second area, but still within the first area, the user device 103 can be determined to keep the present location situation, i.e., it might be determined to be within the service area. Further, when the user device 103 moves out of the first area, the user device 103 can be determined to be out of the service area. In other words, the user device can be determined to be out of the service area when a position of the user device is determined to be out of a first area defined by a first threshold boundary.

The user device can be determined to be within the service area when the position of the user device is determined to be within a second area defined by a second threshold boundary. Further, the user device can be determined to keep the present location situation when the position of the user device is determined to be out of the second area, but within the first area. Here, when the user device 103 is determined to be out of the second area, but within the first area (in other words, in an intermediate region), it can be determined to keep the present location situation of the user device 103, which means to maintain the location situation of the user device 103.

Thus, when the user device 103 is previously determined to be within the service area, then it can be determined to be still in the service area, and when it is previously determined to be out of the service area, and it can still be determined to be out of the service area. For example, when the user device 103 is close to the service area and passes through the first threshold boundary, the present location situation of the user device is out of the service area (in other words, before it passes through the first threshold boundary it was determined to be out of the service area), therefore, the user device 103 can be determined to be out of the service area also. In contrast, when the user device departs from the service area and enters into the intermediate region, because it was previously determined to be within the service area, it can still be determined to be within the service area.

By setting two threshold boundaries, the present disclosure at least has the following advantages.

First, because any localization method has a certain error, when only one threshold boundary is set, the user device can be determined to be at two different location situations even though no movement or very little movement of the user device has occurred, which means the location situation of the user device can be changed between "within the service area" and "out of the service area", which can lead to poor system stability and a poor user experience. However, when two threshold boundaries are applied, a tolerance range or interval range is provided, such that the system can determine the user device to keep the present location situation, and frequently changing the location situation of the user device between "within the service area" and "out of the service area" due to localization error can be avoided.

Second, when the user departs from the service area to the boundary because of a special reason (e.g., answering a call), rather than really intending to leave the service area, the user can still be determined to be within the service area by utilizing the double threshold boundaries. Therefore, when the user comes back to the service area again, the re-authorizing process for accessing the service device is not needed, which can improve the user experience. Of course, when the user departs away from the first area, then the user device can be determined to be out of the service area, and when the user comes back to the service area again, the re-authorizing process for accessing the service device is needed.

According to some examples of the present disclosure, when the user device 103 is determined to be within the service area, the master device 102A can allow the user device access to the service devices 102A-102C in the service area, and when the user device 103 is determined to be out of the service area, the master device 102A can forbid the user device access to the service devices 102A-102C in the service area. The authorized access process of the master device 102A can be realized using several methods, for example, a list of authorized user devices within the service area can be stored in the master device 102A. For example, when a user device is determined to be within the service area, the master device can store the ID (and the ID can be sent from the user device to the master device 102A via the first or the second type of wireless signals) of the user device, and when the user device is determined to be out of the service area, the master device 102A can delete the user device from the list. Therefore, when a user device 103 sends an access request for accessing the service area to the master device 102A, the master device 102A can check whether the user device 103 is on the list or not. When the user device is on the list, then the access request can be allowed, otherwise it is forbidden.

Here, the service devices 102A-102C comprise a sub-service system, and any one of the user devices 103 that wants to access any one of the service devices 102A-102C in the sub-service system, can request authorization from the master device 102A. Therefore, the master device 102A can allow or forbid the access request of the user device 103 for any service device in the sub-service system.

In some examples, when the user device 103 is determined to be within the service area, the master device 102A can directly connect to the user device 103 via the first type of wireless signals (for example, Wi-Fi signals) or the second type of wireless signals (for example, Bluetooth signals), such that the user device 103 can access the service devices 102A-102C located in the service area. In this case, data interaction between the user device 103 and the service devices 102A-102C cannot be relayed via the outside network so that the data security is better.

In the above examples, optionally, the service devices 102A-102C can monitor and locate the user device 103 according to an appointment of the user device 103 for accessing the service area. In this case, the user device 103 can make an appointment before it wants to access a service device in the service area. For example, the user can open an application program through the user device and login to the service device's appointment page, and then send the appointment request to the master device 102A or a separate control device. When the appointment is successfully made, the master device 102A or the separate control device can store the appointment information of the user device (e.g., the ID of the user device, appointment time, etc.) in an appointment list.

Further, the service device only turns on the monitor and location mode, for example, the Bluetooth monitor mode when the appointment list indicates that there is some user device that wants to access the service device, and the service device turn offs the monitor and location mode when there is no user device that wants to access the service area, thus saving energy. Additionally, when the service device receives different Bluetooth advertising information from different user devices, the service device will only handle the Bluetooth advertising information received from a user device that appears in the appointment list, and the Bluetooth advertising information from other user devices is abandoned. It should be noted that the service devices can also be accessed without an appointment. For example, the service devices can be assigned to user devices periodically. In this case, the master device 102 or the separate control device can store an assignment list.

In addition, in the above examples, optionally, the modified location parameter can be fed back to the user device and displayed on a map of the user device, so as to realize a navigation function for the user and guide the user to the service area.

According to the above examples, it is possible to locate the user device and determine its position status more accurately, and to track and determine access authorization for a user device.

FIG. 2 is a flowchart illustrating an area restricted access method 200 according to one embodiment of the present disclosure. The method 200 can be implemented by the above-described area restricted access system.

Step S201 includes locating a user device via a first type of wireless signals (e.g., Wi-Fi signals) and obtaining a first location parameter.

Step S202 includes monitoring and locating the user device via a second type of wireless signals (e.g., Bluetooth signals, infrared signals, or ultrasonic signals) that are different from the first type of wireless signals, and obtaining a second location parameter.

Step S203 includes obtaining a modified location parameter based on the first and second location parameters, and determining whether the user device is within or out of a service area based on the modified location parameter.

Step S204 includes allowing the user device access to a service device located in the service area when the user device is determined to be within the service area, and forbidding the user device access to the service device when the user device is determined to be out of the service area.

In an alternative embodiment, in step S203, the modified location parameter can be a weighted average value of the first and second location parameters, and a weight of the second location parameter increases as the user device becomes closer to the service area.

In an alternative embodiment, as shown in FIG. 3, in step S203, the step of determining whether the user device is within or out of the service area based on the adjusted location parameter includes the following steps.

In step S2034, it is determined whether the user device is within a first area. If so (Yes in step S2034), in step S2035, it is determined whether the user device is within the second area. If so (Yes in step 2035), the process proceeds to step S2032. Otherwise (No in step S2035), the process proceeds to step S2033. In step S2034, when it is determined that the user device is not within the first area (No in step S2034), the process proceeds to step S2031.

In step S2031, the process determines that the user device is out of the service area when a position of the user device based on the modified location parameter is determined to be out of a first area defined by a first threshold boundary.

In step S2032, the process determines that the user device is within the service area when the position of the user device based on the modified location parameter is determined to be within a second area defined by a second threshold boundary, wherein the second area is within the first area.

In step S2033, the process determines that the user device keeps a present location when the position of the user device based on the modified location parameter is determined to be out of the second area but within the first area.

In an alternative embodiment, in step S204, a master device 102A can connect to the user device 103 via the second type of wireless signals when the user device is determined to be within the first area based on the modified location parameter.

In an alternative embodiment, in step S204, a master device of the service device can directly connect to the user device via the first or second type of wireless signals when the user device is determined to be within the service area, such that the user device can access the service device located in the service area.

In an alternative embodiment, in step S202, the monitoring and locating is based on an appointment of the user device for accessing the service area.

The area restricted access method 200 can be understood to those skilled in the art with reference to the above description of system 100, therefore a more detailed description will be omitted. Moreover, those skilled in the art will appreciate that each step of the method 200 can be implemented e.g., by combining software with common hardware (e.g., a CPU which is an example of processing circuitry), firmware, special hardware, integrated circuits, etc.

FIG. 4 illustrates a process sequence of the area restricted access method according to one embodiment of the present disclosure. According to the above description, the present disclosure relates to an area restricted access system, and the area restricted access system can comprise an access device and a sub-service system, while the sub-service system can include at least one service device located in the service area. When the sub-service system includes plural service devices, one service device can act as a master device and the other devices can act as slave service devices.

FIG. 4 shows the interaction and operation between the user device 103, the access device 101, the master device 102A, and the slave devices 102B and 102C according to one example. In the example shown in FIG. 4, the user device 103 has a Wi-Fi interface and a Bluetooth interface, the master device also has a Bluetooth interface and a Wi-Fi interface. The user device can connect to an access point of the access device via the Wi-Fi interface so as to connect to the access device, and the access device can connect to the master device via the Wi-Fi interface so that a connection channel can be formed between the user device, the access device, and the master device. At the same time, the master device and the slave device connect to each other via a wireless or a wired manner and compose a sub-service system, and either the master device or the slave device can have a Bluetooth interface for monitoring and locating the user device.

The processing for when the user is close to and enters into the service area is shown in FIG. 4 from top to bottom. At first, the user device can make an appointment which, as described above, can be implemented as a user device opening an application and logging into the appointment page of the service area. If there is an appointment, the service device can turn on the Bluetooth (for example, BLE) monitoring mode and monitor the user device, and the user device turns on the Bluetooth advertising mode correspond.

Next, the service device can locate the user device via the Bluetooth signals and obtain a second location parameter (S202), and at the same time, the access device can locate the user device via Wi-Fi signals and obtain a first location parameter (S201). Further, the first location parameter and the second location parameter can be merged to generate a modified location parameter (S203). It should be noted that merging the first location parameter and the second location parameter can be implemented in the access device, in the master device, or in a separate control device.

As shown in FIG. 4, the weight of the second location parameter can be increased while the weight of the first location parameter can be decreased when the user device 103 is close to the service area. In one example, the weight can be changed when the distance from the user device to the service area is smaller than a threshold. At the same time, the access device can determine whether the user device enters into the range of the first threshold (corresponding to the first area limited by the first threshold boundary described above) or not (S2031), and the access device 101 sends a prompting message to the master device when the user device is determined to enter into the range of the first threshold. Further, the master device can send a Bluetooth connection request to the user device based on the prompting message, and the user device can be Bluetooth connected with the master device in response to the Bluetooth connection requirement.

After that, the master device 102A can further determine whether the user device enters into a range of the second threshold (corresponding to the second area limited by the second threshold boundary described above) or not. The master device can determine that the user device is within the service area when it is determined that the user device enters into the range of the second threshold (S2032), and can authorize the user device to access the service device located in the service area.

When the user device is determined to be within the service area, the master device 102A can directly connect to the user device 103 via a traditional Wi-Fi end-to-end (P2P) connection. At that time, the user device 103 can disconnect from the access device 101 and directly connect to the master device 102A so that the user device 103 can become a slave node of the Wi-Fi end-to-end (P2P) connection, while the master device 102A can become the master node of the Wi-Fi end-to-end (P2P) connection. The other service devices 102B and 102C are also slave nodes of the master device 102A. After the user device 103 and the master device 102A are connected via the P2P connection, desired operations, such as using a printer for printing, using a projector for projecting, etc. can be performed. Through the P2P connection, information interaction between the user device 103 and the service devices 102A-102C is not forwarded through an external network and data security is improved.

Figure 5B:
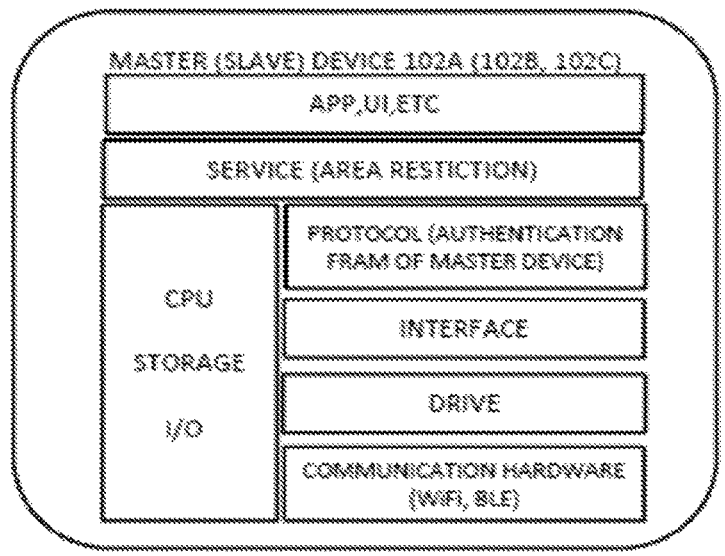
Figure 5C:
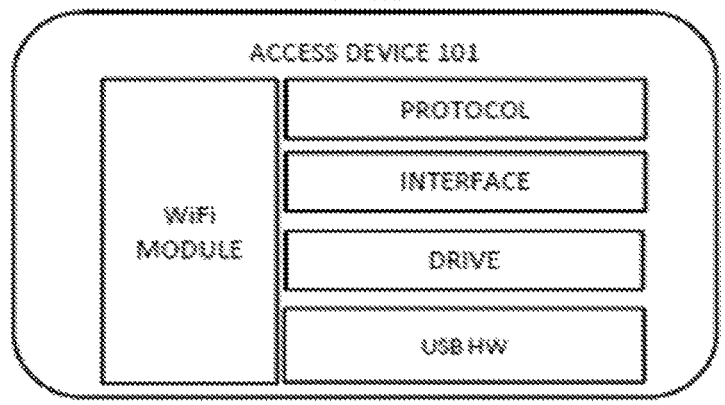

FIGS. 5A to 5C respectively illustrate block diagrams of a user device 103, a master device 102A (or slave devices 102B and 102C), and an access device 101, which can be used to implement the embodiments of the present disclosure.

However, each of the devices shown in FIGS. 5A to 5C is just an example and each of them can further include any other proper components, or omit some parts according to particular needs.

As described above, the master device 102A (or slave devices 102B and 102C) can be any network device, such as a computer, a printer, a scanner, a projector, etc. The access device 101 can be a Wi-Fi base station, a Bluetooth base station, an IR signal transmission device, etc. The user device 103 can be any mobile device such as a cellular phone, a tablet computer, or a laptop computer, etc. The hardware structure of each of the user device, service device, and access device can be configured as shown in FIG. 5A to FIG. 5C, respectively.

In the above disclosure, a process of a user device 103 moving from far away from a service area to closer to and entering into the service area is described as an example. However, it should be noted that, the above-described process is just an example, and the present disclosure should not be limited to that example. Moreover, the process of the user device becoming unconnected and breaking away from the service device is opposite to the above-described process, and the detail explanation will be omitted.

It should be noted that advantages or effects described above are just examples, and the embodiments are not limited to those advantages or effects. The above descriptions of the embodiments are just examples, and various modifications, replacements, or combinations can be made without departing from the scope of the present disclosure by persons skilled in the art.

Further, the block diagrams of the units, apparatuses, devices and system are just examples, and the connection, placement and configuration illustrated in the block diagrams related to the present disclosure are not limited to these examples, and the units, apparatuses, devices and system may be connected, placed, or configured in any way. The terms "comprise", "include" and "have" are open-form terms, which mean and may be changed into "include and is not limited to." The terms "or" and "and" mean and may be changed into "and/or," unless the context dictates otherwise. The term "such as" means and may be changed to "such as, but not limited to."

The flowcharts and the methods according to the present disclosure are just examples, and are not limited to the steps in the disclosed embodiments. The steps of the disclosed embodiments can be performed in any order. The terms "next", "subsequently" and "then" are just for describing the present disclosure, and the present disclosure is not limited to these terms. Furthermore, the articles "a", "an," and "the" should not be limited to be singular elements.

Furthermore, the term "or" before the term "at least one" means a separate enumerating, and for example, "at least one of A, B, or C" means (1) A, B, or C, (2) AB, AC, or BC, or (3) ABC (namely, A and B and C). Additionally, the term "example" does not mean a preferable example or an example superior to other examples.

It should be noted that, in the apparatus and method of the embodiments, each unit or each step may be divided and/or recombined. The division and/or recombination are equivalents of the embodiments.

The present specification and the appended claims include other examples and implementations. For example, the above functions can be implemented by a processor, hardware, software, firmware, hard-wiring or any combination thereof. The features for implementing the functions can be located at any physical position, which can distributed physically. The present disclosure can use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments, all of which can be referred to as "processing circuitry". The general-purpose processor is a micro-processor, and alternatively, the processor can be any number of processors, controllers, micro-controllers or state machines that can be obtained commercially. The processor can also be a combination of computer equipment, such as a combination of a DSP and a micro-processor, a combination of plural micro-processors, or a combination of a DSP and plural micro-processors. When the disclosed functions are implemented by software, a program to implement the functions can be stored in a computer-readable medium as one or more commands. The recording medium can be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disks include a CD, a laser disc, an optical disc, a DVD disc, a floppy disk and a blue-ray disc, and the disk usually reproduces data and the disc reproduces data by a laser.

The above operations can be performed by a computer program product. For example, such a computer program product can be a tangible medium where computer-readable commands are stored (or coded), and the commands can be executed by one or more processors to perform the operation. The computer program product can include packaging material.

Various modifications, replacements or combinations can be made without departing from the scope of the present disclosure by persons skilled in the art. Furthermore, the scope of the present specification and the claims are not limited to the above processing, machine, manufacture, composition of events, means, method, and operation. The processing, machine, manufacture, composition of events, means, method and operation with a similar function or a similar result can also be applied to the present disclosure. Therefore, the scope of the appended claims includes such processing, machine, manufacture, composition of events, means, method, and operation.

The methods or apparatuses of the present disclosure are described above. However, the above descriptions of the embodiments are just examples, and various modifications, replacements, or combinations can be made without departing from the scope of the present disclosure by persons skilled in the art.

The invention claimed is:

1. An area restricted access system, comprising: an access device including first processing circuitry configured to locate a user device via a first type of wireless signals using a first transmission protocol and obtain a first location parameter; and
   a first service device located in a service area and including second processing circuitry configured to monitor and locate the user device via a second type of wireless signals using a second transmission protocol, the second type of wireless signals being different from the first type of wireless signals, and obtain a second location parameter, wherein the first service device is configured to obtain the second location parameter, which indicates a distance of the user device from a center of the service area, wherein
   the access device is configured to receive the second location parameter from the first service device, calculate a modified location parameter based on a combination of the obtained first location parameter and the received second location parameter, obtained from the first and second types of wireless signals having the first and second transmission protocols, respectively, and determine whether the user device is within or out of the service area based on the modified location parameter, wherein the modified location parameter calculated by the access device is a weighted average value of the first and second location parameters, and a weight of the second location parameter used in calculating the weighted average value is increased by the access device as the user device becomes closer to the center of the service area, and
   wherein the determining of whether the user device is within or out of the service area based on the modified location parameter includes:
   determining that the user device is out of the service area when a position of the user device is determined, based on the modified location parameter, to be out of a first area defined by a first threshold boundary,
   determining that the user device is within the service area when the position of the user device is determined, based on the modified location parameter, to be within a second area defined by a second threshold boundary, wherein the second area is within the first area, and
   determining that the user device keeps a present location when the position of the user device is determined, based on the modified location parameter, to be out of the second area, but within the first area; and
   the first service device is configured to allow the user device to access the first service device when the user device is determined to be within the service area, and forbid the user device to access the first service device when the user device is determined to be out of the service area.

2. The area restricted access system according to claim 1, wherein the first service device is configured to connect to the user device via the second type of wireless signals when the user device is determined to be within the first area based on the modified location parameter.

3. The area restricted access system according to claim 1, wherein the first service device is configured to directly connect to the user device via the first or second type of wireless signals when the user device is determined to be within the service area, such that the user device has access to the service device located in the service area.

4. The area restricted access system according to claim 1, wherein the first type of wireless signals is Wi-Fi signals, and the second type of wireless signals is Bluetooth signals, infrared signals, or ultrasonic signals.

5. The area restricted access system according to claim 1, wherein the first service device is configured to monitor and locate the user device according to a scheduled appointment of the user device for accessing the service area.

6. The area restricted access system of claim 1, further comprising a second service device located in the service area,
   wherein the first service device is configured as a master device and the second service device is configured as a slave device, and
   the master device is further configured to allow the user device to access the slave device when the user device is determined to be within the service area, and forbid the user device to access the slave device when the user device is determined to be out of the service area.

7. The area restricted access system of claim 1, wherein the first processing circuitry is configured to determine a first distance from the user device to the center of the service area as the first location parameter, and the second processing circuitry is configured to determine a second distance from the user device to the center of the service area as the second location parameter.

8. An area restricted access method, comprising: locating, by an access device, a user device via a first type of wireless signals using a first transmission protocol and obtaining a first location parameter;
   monitoring and locating, by a first service device located in a service area, the user device via a second type of wireless signals using a second transmission protocol, the second type of wireless signals being different from the first type of wireless signals, and obtaining a second location parameter;
   receiving, by the access device from the first service device, the second location parameter, wherein the first service device obtains the second location parameter, which indicates a distance of the user device from a center of the service area:
   calculating, by the access device, a modified location parameter based on a combination of the first and second location parameters, obtained from the first and second types of wireless signals having the first and second transmission protocols, respectively, and determining whether the user device is within or out of a die service area based on the modified location parameter, wherein the modified location parameter calculated by the access device is a weighted average value of the first and second location parameters, and a weight of the second location parameter is increased by the access device as the user device becomes closer to a center of the service area; and
   determining whether the user device is within or out of the service area based on the modified location parameter includes:
   determining that the user device is out of the service area when a position of the user device based on the modified location parameter is determined to be out of a first area defined by a first threshold boundary,
   determining that the user device is within the service area when the position of the user device based on the modified location parameter is determined to be within a second area defined by a second threshold boundary, wherein the second area is within the first area, and determining that the user device keeps a present location when the position of the user device based on the modified location parameter is determined to be out of the second area, but within the first area; and allowing the user device access to a first service device located in the service area when the user device is determined to be within the service area, and forbidding the user device access to the first service device when the user device is determined to be out of the service area.

9. The method according to claim 8, wherein the first service device is configured to connect to the user device via the second type of wireless signals when the user device is determined to be within the first area based on the modified location parameter.

10. The method according to claim 8, wherein the first service device is configured to directly connect to the user device via the first or second type of wireless signals when the user device is determined to be within the service area, such that the user device has access to the first service device located in the service area.

11. The method according to claim 8, wherein the first type of wireless signals is Wi-Fi signals, and the second type wireless signals is Bluetooth signals, infrared signals, or ultrasonic signals.

12. The method according to claim 8, wherein the monitoring and locating is based on a scheduled appointment of the user device for accessing the service area.

13. The method of claim 8, further comprising allowing the user device access to a second service device located in the service area,
wherein the first service device is configured as a master device and the second service device is configured as a slave device, and
the master device is further configured to allow the user device to access the slave device when the user device is determined to be within the service area, and forbid the user device to access the slave device when the user device is determined to be out of the service area.

14. A non-transitory computer-readable storage medium storing computer-executable instructions, which when executed by a computer, cause the computer to execute an area restricted access method comprising:

locating a user device via a first type of wireless signals using a first transmission protocol and obtaining a first location parameter;

monitoring and locating the user device via a second type of wireless signals using a second transmission protocol, the second type of wireless signals being different from the first type of wireless signals, and obtaining a second location parameter, which indicates a distance of the user device from a center of a service area:

calculating a modified location parameter based on a combination of the first and second location parameters, obtained from the first and second types of wireless signals having the first and second transmission protocols, respectively, and determining whether the user device is within or out of the service area based on the modified location parameter wherein the modified location parameter is a weighted average value of the first and second location parameters, and a weight of the second location parameter is increased as the user device becomes closer to the center of the service area; and determining whether the user device is within or out of the service area based on the modified location parameter includes:

determining that the user device is out of the service area when a position of the user device based on the modified location parameter is determined to be out of a first area defined by a first threshold boundary, determining that the user device is within the service area when the position of the user device based on the modified location parameter is determined to be within a second area defined by a second threshold boundary, wherein the second area is within the first area, and determining that the user device keeps a present location when the position of the user device based on the modified location parameter is determined to be out of the second area, but within the first area; and allowing the user device access to a first service device located in the service area when the user device is determined to be within the service area, and forbidding the user device access to the first service device when the user device is determined to be out of the service area.

* * * * *